United States Patent [19]

Borzym et al.

[11] Patent Number: 4,499,803
[45] Date of Patent: Feb. 19, 1985

[54] DOUBLE CUT DIE SET WITH IMPROVED PULL-ACROSS NOTCHING FEATURE

[75] Inventors: John J. Borzym, Birmingham; Alexander Borzym, West Bloomfield Township, Ingham County, both of Mich.

[73] Assignee: Alpha Industries, Inc., Novi, Mich.

[21] Appl. No.: 539,807

[22] Filed: Oct. 7, 1983

[51] Int. Cl.³ .................... B23D 21/00; B26D 3/16
[52] U.S. Cl. .................................. 83/319; 83/54; 83/300; 83/382; 83/519
[58] Field of Search ............... 83/319, 54, 300, 382, 83/456, 519

[56] References Cited

U.S. PATENT DOCUMENTS

| | | | |
|---|---|---|---|
| 3,938,415 | 2/1976 | Borzym | 83/519 X |
| 4,108,029 | 8/1978 | Borzym | 83/54 |
| 4,109,555 | 8/1978 | Borzym | 83/319 X |
| 4,294,149 | 10/1981 | Borzym | 83/382 |
| 4,337,680 | 7/1982 | Borzym | 83/456 |
| 4,361,064 | 11/1982 | Sasaki | 83/319 |
| 4,392,644 | 7/1983 | Borzym | 83/319 X |
| 4,457,200 | 7/1984 | Borzym | 83/54 X |

Primary Examiner—Donald R. Schran
Attorney, Agent, or Firm—Krass & Young

[57] ABSTRACT

Tube cutoff apparatus of the double cut type wherein a horizontal blade passes across and notches a section of tube wall prior to the entry of a vertical severing blade. The horizontal blade holder assembly comprises a carriage which is interconnected with the base by means of a pair of parallelogram links. In one embodiment the horizontal blade holder assembly is driven through an arcuate path of travel by a depending dogleg cam which is mounted on the upper platen assembly of a die set. In a second embodiment the horizontal blade holder assembly is driven by a linkage including a triangular link and a drive link connected to the upper platen assembly. The result in both cases is to drive the horizontal blade holder assembly through an arcuate path which carries it downwardly and away from the path of the vertical blade in a minimum vertical stroke length. In both embodiments, means are provided for adjusting the vertical position of the notching blade relative to the tube section to accommodate tubes of varying diameter.

11 Claims, 10 Drawing Figures

DOUBLE CUT DIE SET WITH IMPROVED PULL-ACROSS NOTCHING FEATURE

INTRODUCTION

This invention relates to cutoff apparatus for tubing and particularly to an improved cutoff apparatus of the double cut type in which novel means are provided for operating the horizontal notching blade.

BACKGROUND OF THE INVENTION

A tube cutoff apparatus is typically employed at the end of a tube fabricating mill to cut the tubing into lengths as it emerges from the mill. Cutoff apparatus is also used for recut operations where it is desired to cut an existing piece of finished tubing into several shorter lengths.

A known tube cutoff apparatus comprises a press and a die set operated by the press. The die set is adapted to accommodate a particular shape and size of tubing and includes means for holding one or more blades which are used in the cutoff operation. A so-called "single-cut" apparatus employs a single blade which is driven by the press and die set through the tubing. A single cut apparatus typically leaves a dented or distorted end on the tubing and, therefore, may require secondary operations to restore the tube end to a round configuration. A so-called "double cut" apparatus comprises a first blade which passes across a section of tube wall to scarf or notch the tubing, and a second blade which is thereafter driven through the tubing using the notch as an entry point. Given blades of proper construction and condition, this apparatus tends to produce an undistorted or "dimple free" tube end.

There are several approaches which may be taken to the design of a double cut apparatus. One approach is illustrated in U.S. Pat. No. 4,109,555, issued Aug. 29, 1978, to Alexander Borzym and assigned to Alpha Industries, Inc. of Novi, Mich. In this device, the notching blade is driven by a cam depending from an upper die set platen through a cutting stroke and a return stroke immediately prior to the entry of a second severing blade. Another approach is illustrated in U.S. Pat. No. 4,108,029, issued Aug. 22, 1978, to Alexander Borzym and assigned to Alpha Industries, Inc. In this device, the notching blade is also driven by a depending cam, but is drawn across the tubing in a single unidirectional stroke as the upper platen descends and is returned to a home position as the die set is reopened. This single stroke or "draw across" approach is also illustrated in U.S. Pat. No. 4,294,147, issued Oct. 13, 1981, to John J. Borzym.

An advantage of the latter design approach; i.e., the single stroke or "draw across" design, is that the notching blade moves in a single direction as the die set is closed and tends to permit the double cut operation to be achieved in a shorter vertical stroke and with less strain on moving parts. The notching blade is returned to a home position as the die set is reopened. It will be understood by those skilled in the art that although the cutoff apparatus may be employed or used in a variety of orientations, the notching blade is typically referred to as the "horizontal blade" and the severing blade is typically referred to as the "vertical blade" and these terms are adopted in this specification without special regard to actual direction.

SUMMARY OF THE INVENTION

This invention provides an improvement to a double cut apparatus of the type wherein the horizontal or notching blade is drawn across and through a tube section in a substantially unidirectional or single stroke manner as the upper platen descends and is restored to a home position as the die set is reopened. In particular, the invention provides a mechanically stable connection between a horizontal blade assembly or carriage and a base mechanism which causes the horizontal blade to move in a substantially arcuate path which takes the horizontal blade not only laterally across the vertical blade path and the tube section, but also downwardly toward the base to quickly clear the horizontal blade out of the way of the vertical blade thereby to permit still further reduction in the stroke length required for the double cut operation.

In both of the two illustrative embodiments of the invention described in detail herein, the stable mechanical connection between the base and the horizontal blade carriage comprises a pair of parallelogram links which provide the aforementioned arcuate path of travel while maintaining the angular attitude or orientation of the horizontal blade throughout its path of travel. In one of the two embodiments the drive connection between the upper platen assembly and horizontal blade holder comprises a depending dogleg cam operating with a follower on the carriage. In the second embodiment the drive means comprises a drive link interconnecting the upper platen with the parallelogram linkage. In both cases, the net effect is to drive the notching blade from a poised position to a cleared position through an arcuate path while maintaining a constant notching blade attitude.

DETAILED DESCRIPTION OF THE SPECIFIC EMBODIMENTS

The following detailed specification describes two embodiments of the invention in the form of die sets having replaceable blades, such die sets being mountable in either flying cutoff presses or stationary recut presses. It is to be understood, however, that the invention may also be embodied in an apparatus in which the die set is physically integrated with the press such that elements designated herein as belonging to the die set actually belong to the press.

Referring now to FIGS. 1–6, the first embodiment of the invention is shown to comprise a base 10 which carries a tube clamping arrangement 12 consisting of jaws 13 which may be opened and closed as hereinafter described to provide clamping forces on a length of tubing 14 which may be either stationary or moving in an axial direction depending upon the particular application of the apparatus under description. The apparatus further comprises an upper platen assembly 16 which is adapted to be reciprocally driven relative to base 10 by a suitable press. The upper platen assembly 16 carries a vertical blade holder 18 and a vertical cutting blade 20 which is configured so as to be capable of penetrating and severing the tubing 14 when the upper platen assembly 16 is driven toward the base 10 by the aforementioned press.

Figure 2:
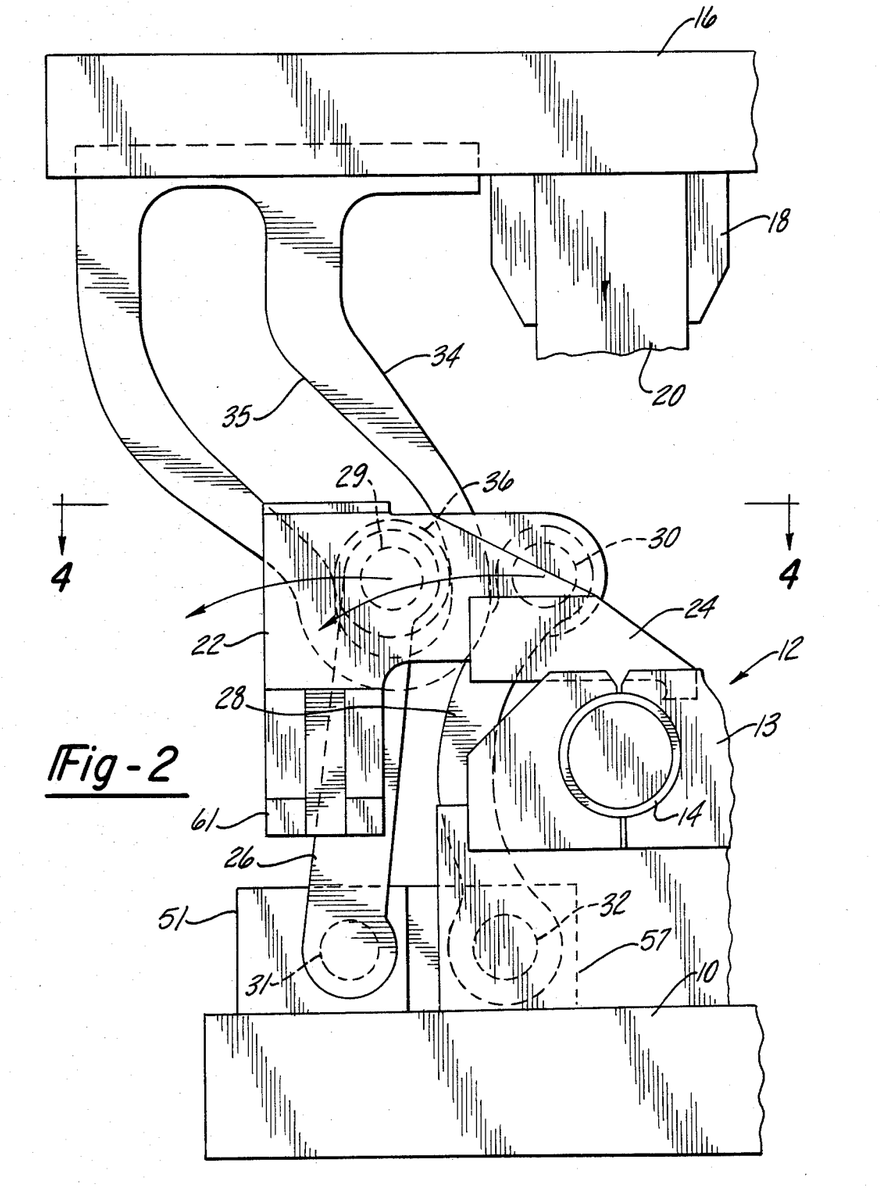
FIG. 2 is a side view of a first embodiment of the invention with the notching blade in the home or poised position and the upper die set platen raised.
Figure 3:
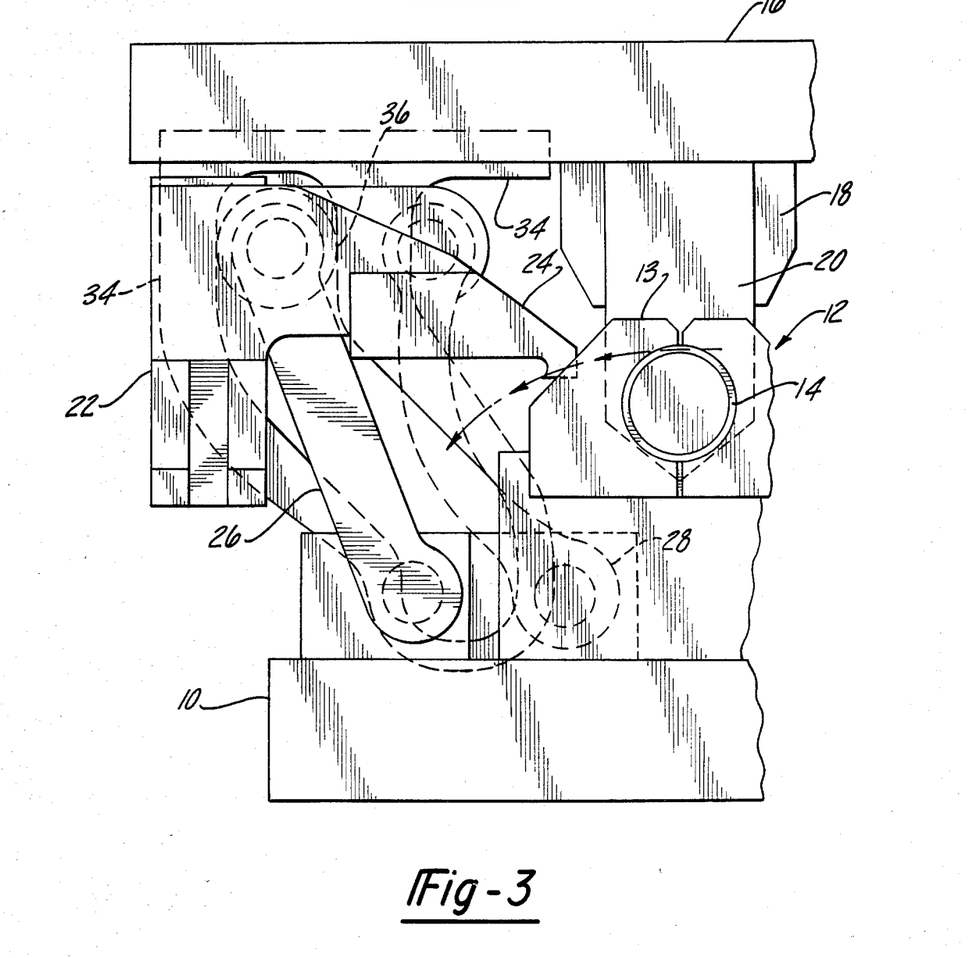
FIG. 3 is a side view of the FIG. 2 apparatus with the notching blade in the cleared position and the platen lowered.
Figure 4:
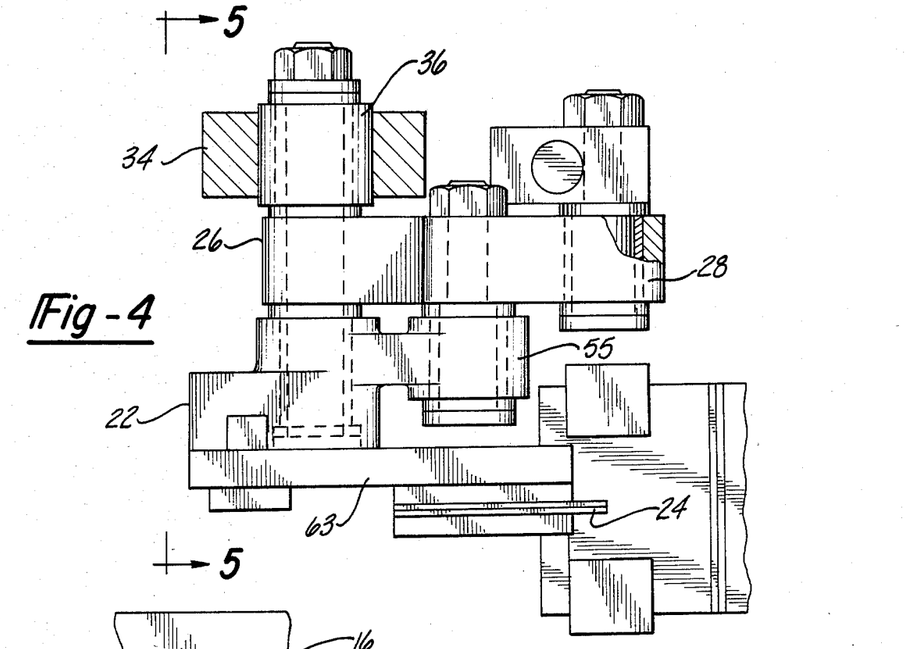
FIG. 4 is a top view of a linkage in the FIG. 2 apparatus along section line 4—4.
Figure 5:
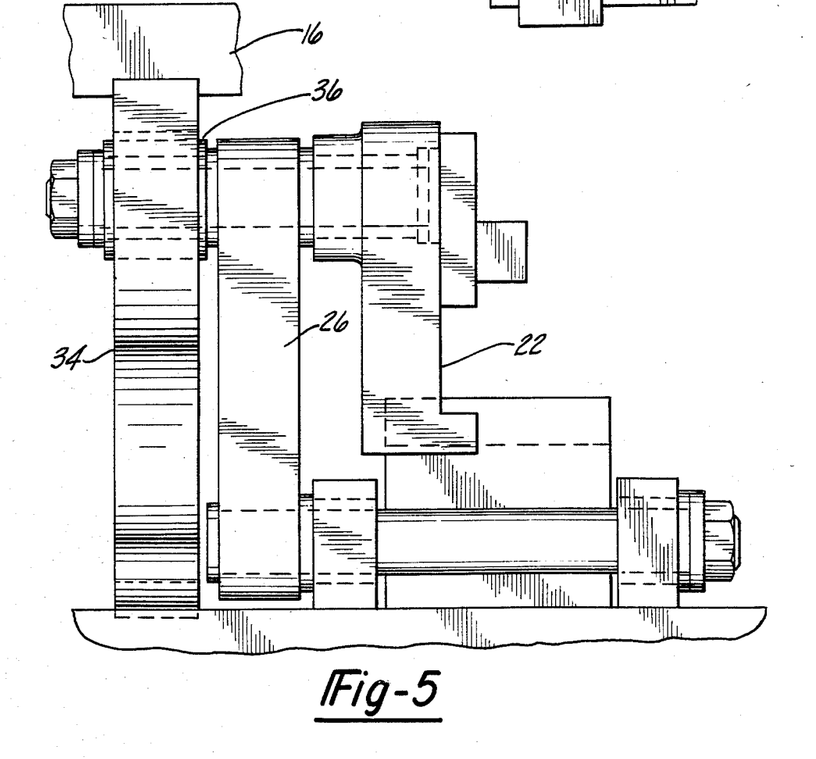
FIG. 5 is an end view of the linkage of FIG. 4.

The apparatus further comprises a horizontal blade carriage 22 carrying a hooked horizontal notching blade 24 which is capable of being drawn across the tubing 14 so as to notch an upper wall section as indicated in the drawing. The notching operation is carried out during the initial portion of the vertical travel of the vertical blade 20 and provides an entry point for the vertical blade.

Figure 6:
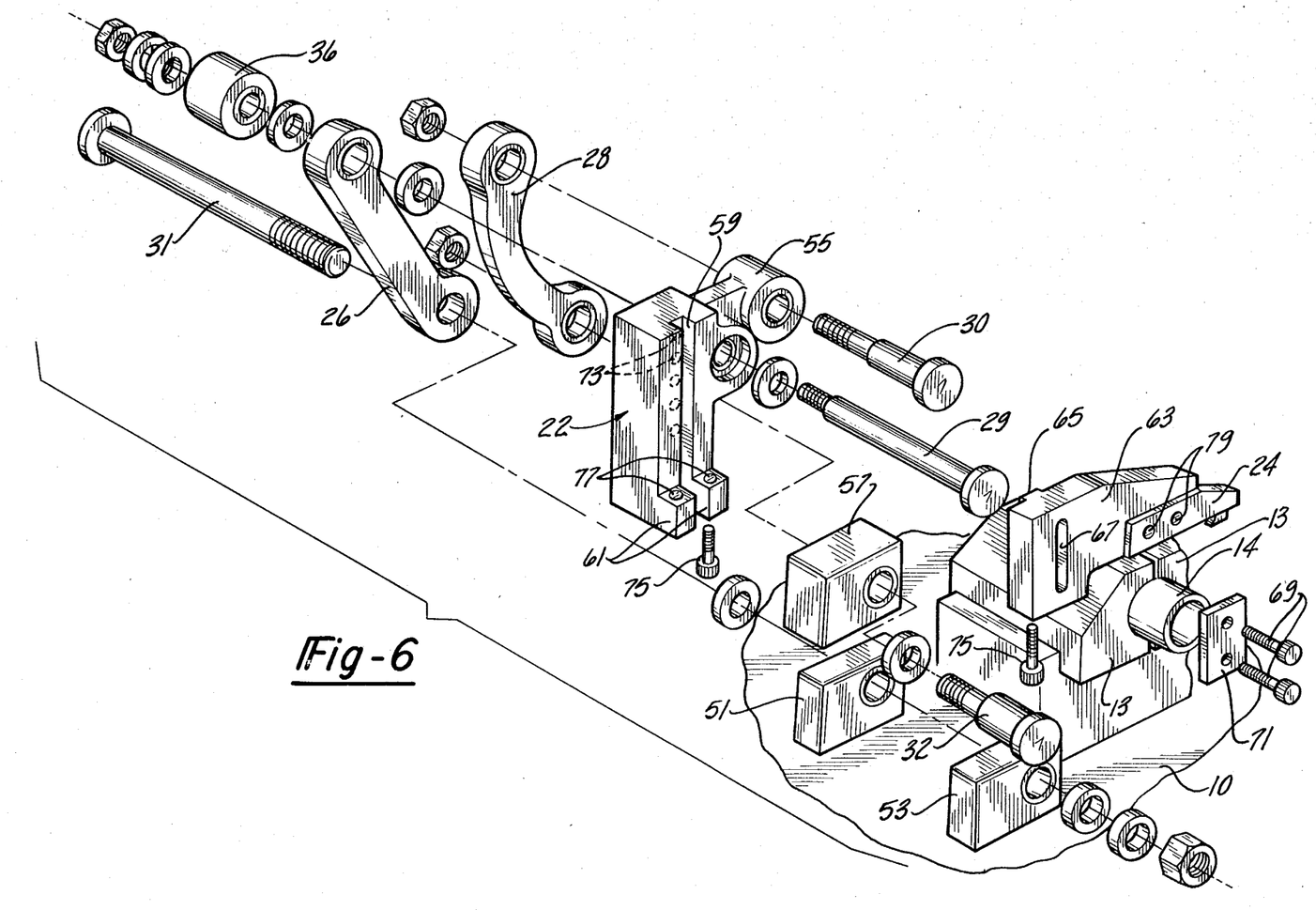
FIG. 6 is an exploded view of the FIG. 2 embodiment.

Blade carriage 22 is mechanically interconnected with the base 10 by means of a pair of parallelogram links 26 and 28. Link 26 is pivotally mounted on a pin 29 which extends commonly through the blade carriage 22 and a cam follower roller 36, as best shown in FIG. 6. The lower end of link 26 receives a pin 31 which extends through bearing blocks 51 and 53 mounted on base 10. Suitable washers, bushings and nuts are provided for securing the pins 29 and 31 in place as shown in FIG. 6. Link 28 is pivotally connected to carriage 22 at the upper end by means of pin 30 which passes through an extension 55 of carriage 22. The lower end of link 28 is pivotally mounted by means of pin 32 which passes through a bearing block 57 mounted on base 10.

As a result of these connections, the path of travel for the blade carriage 22 and blade 24 is arcuate in configuration and includes an initial portion which carries the hooked end to the blade 24 through the upper tubing wall and then progresses laterally and downwardly away from the vertical blade path so as to clear the horizontal blade 24 out of the vertical blade path as quickly as possible in a given press stroke length.

A drive connection between the upper platen assembly 16 and the blade carriage 22 is provided by means of a depending dogleg cam 34 having an internal cam track 35 which is generally obliquely angled. Roller follower 36 on pin 29 rides within the cam track 35 so that vertical displacement between the upper platen assembly 16 and base 10 operates links 26 and 28 and produces lateral travel of blade carriage 22.

The horizontal blade carriage 22 comprises, in addition to the bushing areas for pins 29 and 30, a vertical blade adjustment means in the form of a slot 59 extending between feet 61. A blade holder 63 includes a projection 65 which fits into slot 59 in the manner of a key/keyway combination to allow the holder 63 to be slidingly adjusted up and down for different tube diameters. A slot 67 in holder 63 receives screws 69 to mount a clamp plate 71 on the face of the holder 63. Threaded holes 73 in carriage 22 are provided to permit screws 69 and plate 71 to be mounted in any of several vertical positions. Screws 75 extend through unthreaded holes 77 in feet 61 and into threaded holes (not shown) in the bottom of holder 63 to provide fine vertical adjustment of the position of holder 63 relative to carriage 22. Holder 63 has a relieved face as shown in FIG. 6 to provide a pocket which nestingly receives blade 24. Clamping screws 79 secure the blade 24 to the holder 63. A cover plate may be provided.

Figure 1:
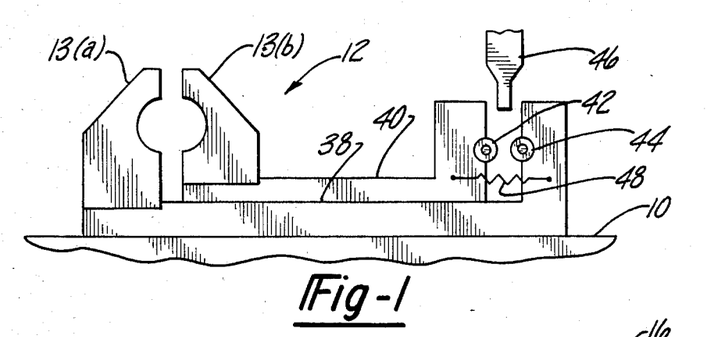
FIG. 1 is a diagrammatic view of a tube clamping device suitable for use with the invention.

As shown in FIG. 1, means 12 are provided for opening and closing the clamping jaws 13 in response to vertical motion of the upper platen assembly 16. This means 12 comprises a slide 38 which rests on the base 10 and which carries a first set of die jaws 13(a), a slide 40 mounted on top of the slide 38 and carrying a second set of die jaws 13(b), follower means 42 and 44 and a depending cam 46 which is carried by the upper platen assembly 16 and positioned so as to be driven between the follower means 42 and 44 as the platen 16 descends. The cam 46 pushes the followers 42 and 44 apart and consequently pushes the die jaws 13(a) and 13(b) together to clamp the tubing 14 as the upper platen assembly 16 descends. Springs 48 may be provided for reopening the clamping jaws 13(a) and 13(b) as the platen assembly 16 ascends. This clamping arrangement is more fully described in the aforementioned Borzym patents.

Referring now to FIGS. 7–10, the second embodiment of the invention is shown to comprise a mechanical linkage which takes the place of the cam 34 and follower 36 of the first embodiment. In describing the second embodiment, reference characters which are common to the previous embodiment will be used to designate components which are common to the first and second embodiments and which are at least essentially unchanged as between the two embodiments.

Figure 7:
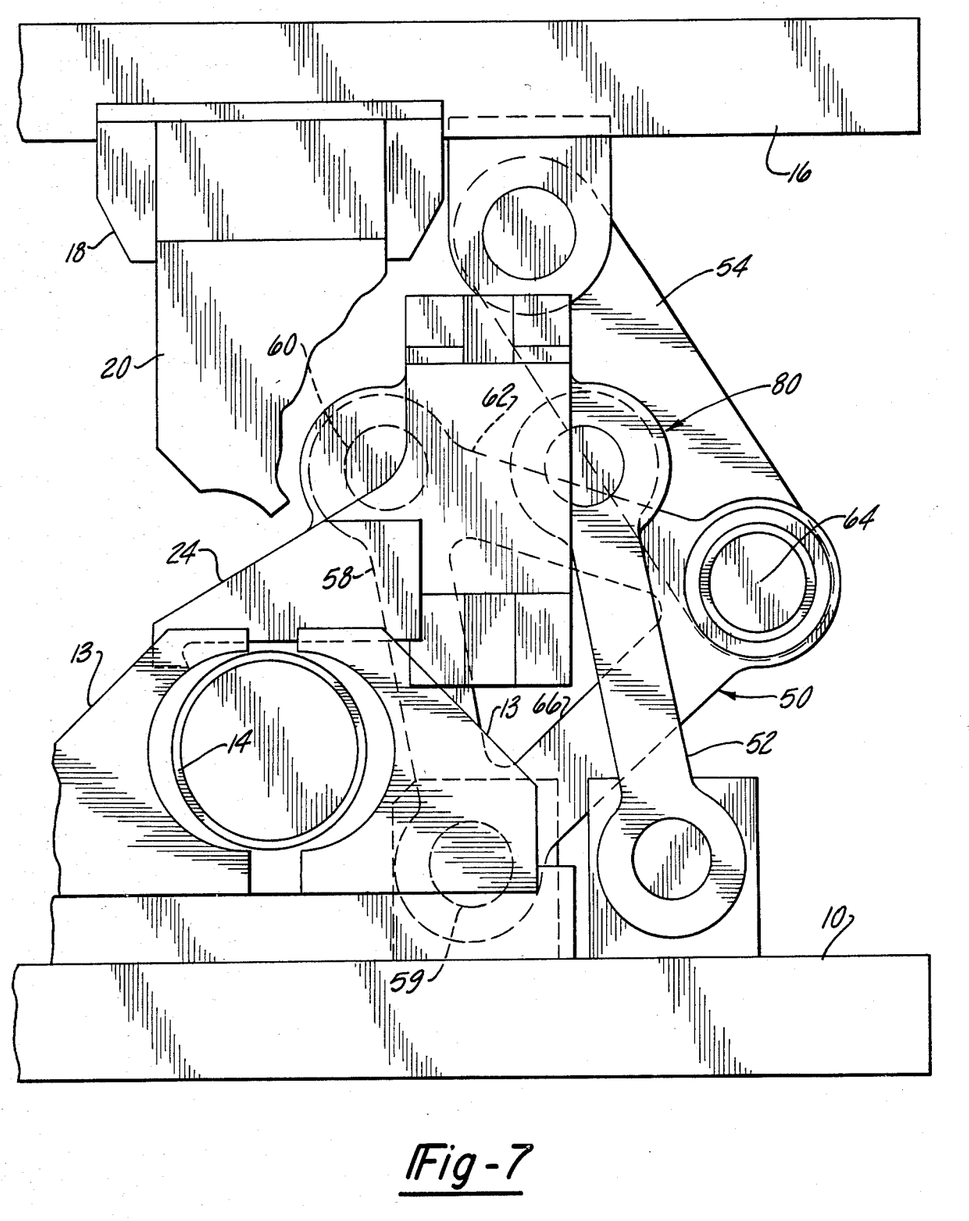
FIG. 7 is a side view of a second embodiment of the invention with the die set opened.
Figure 8:
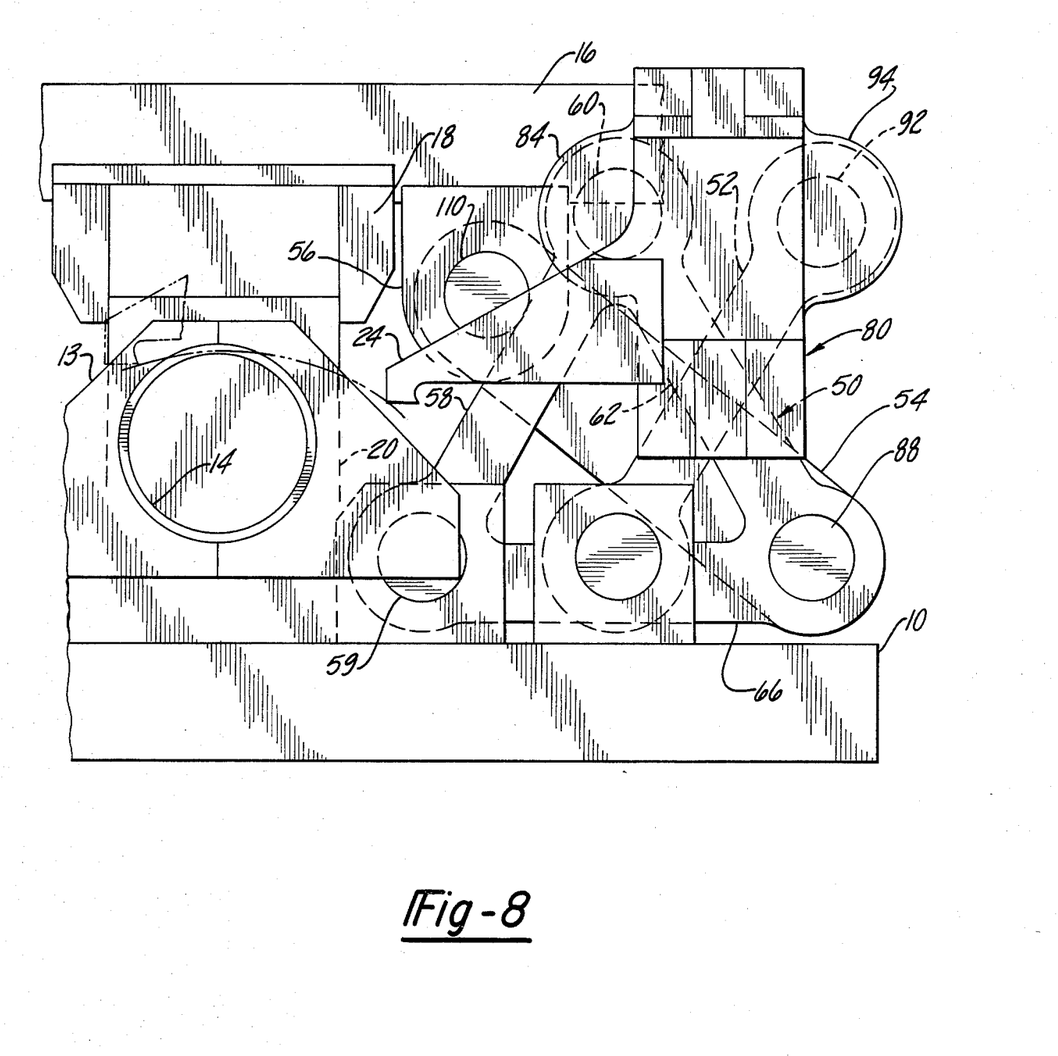
FIG. 8 is a side view of the second embodiment with the die set closed.

In the second embodiment, base 10 carries clamping jaws 13 for clamping and releasing the tubing 14. An upper platen assembly 16 carries a vertical bladeholder 18 and a vertical severing blade 20. Upper platen assembly 16 is adapted to be reciprocally driven relative to the base 10 by a suitable press.

Figure 9:
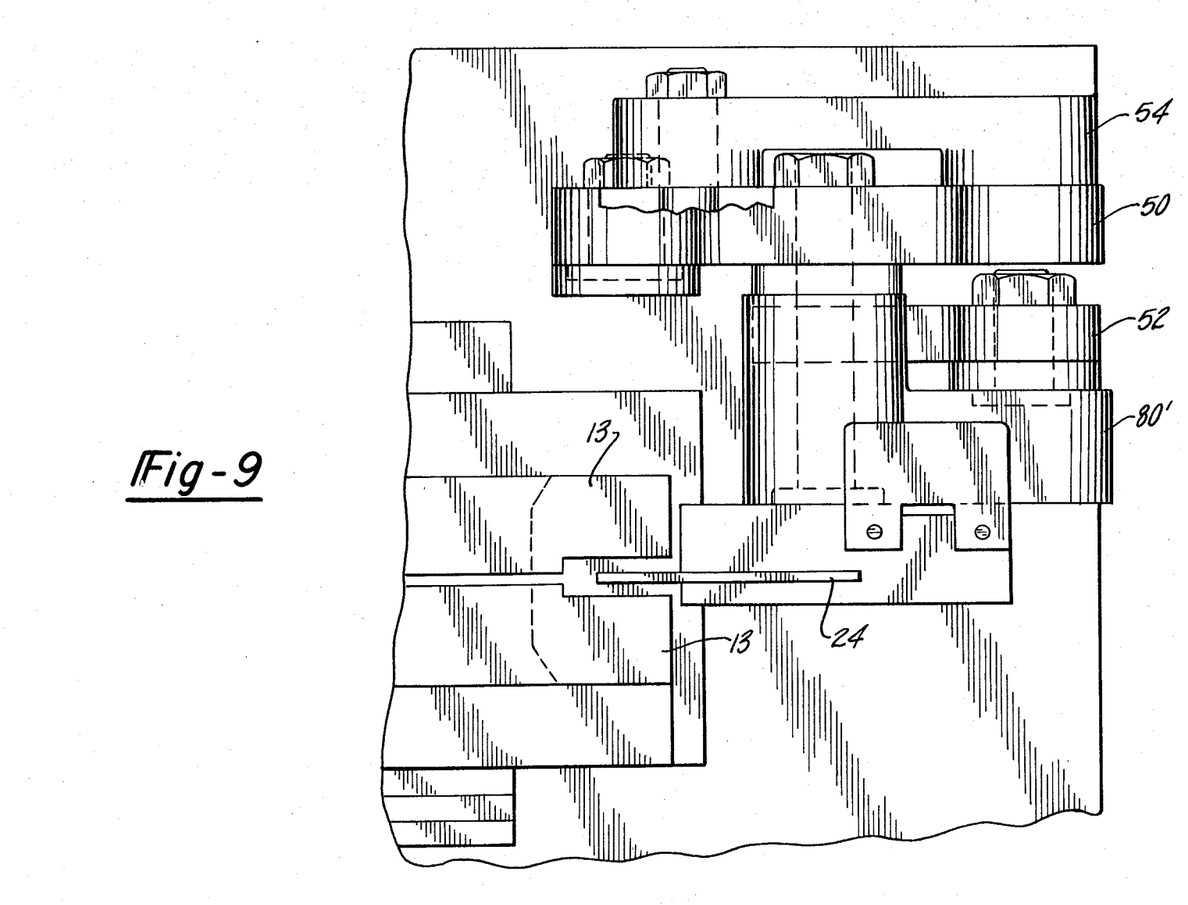
FIG. 9 is a top view of the linkage in the second embodiment.

A notching blade carriage 80 carries a hooked notching blade 24 and is stably mechanically interconnected with the base 10 by means of a parallelogram linkage formed by a triangular link 50 and by a second single leg link 52. Leg 58 of triangular link 50 is connected pivotally to a block 82 on the base 10 by pin 59. The other end of leg 58 is pivotally connected to the blade carriage 80 by pin 60 which passes through a bushing portion 84 of carriage 80. A second leg 62 of link 50 is connected between the blade carriage 80 at pin 59 and the free end of a drive link 54 which is pivotally connected by pin 110 to a bracket 56 depending from the upper platen assembly 16. The pivotal connection between link 54 and link 50 is provided by pin 86. The third leg 66 of the triangular link 50 is connected between the link 54 and base connection pin 59 as shown. Link 52 is connected in parallel with leg 58 of link 50 at one end by a pin 88 which extends through bearing block 90 on base 10 and at the other end by pin 92 which extends through a second bearing portion 94 of the carriage 80. Accordingly, carriage 80 is caused to move through an arcuate path which carries blade 24 across the top of tubing 14 as the platen 16 moves downwardly.

Figure 10:
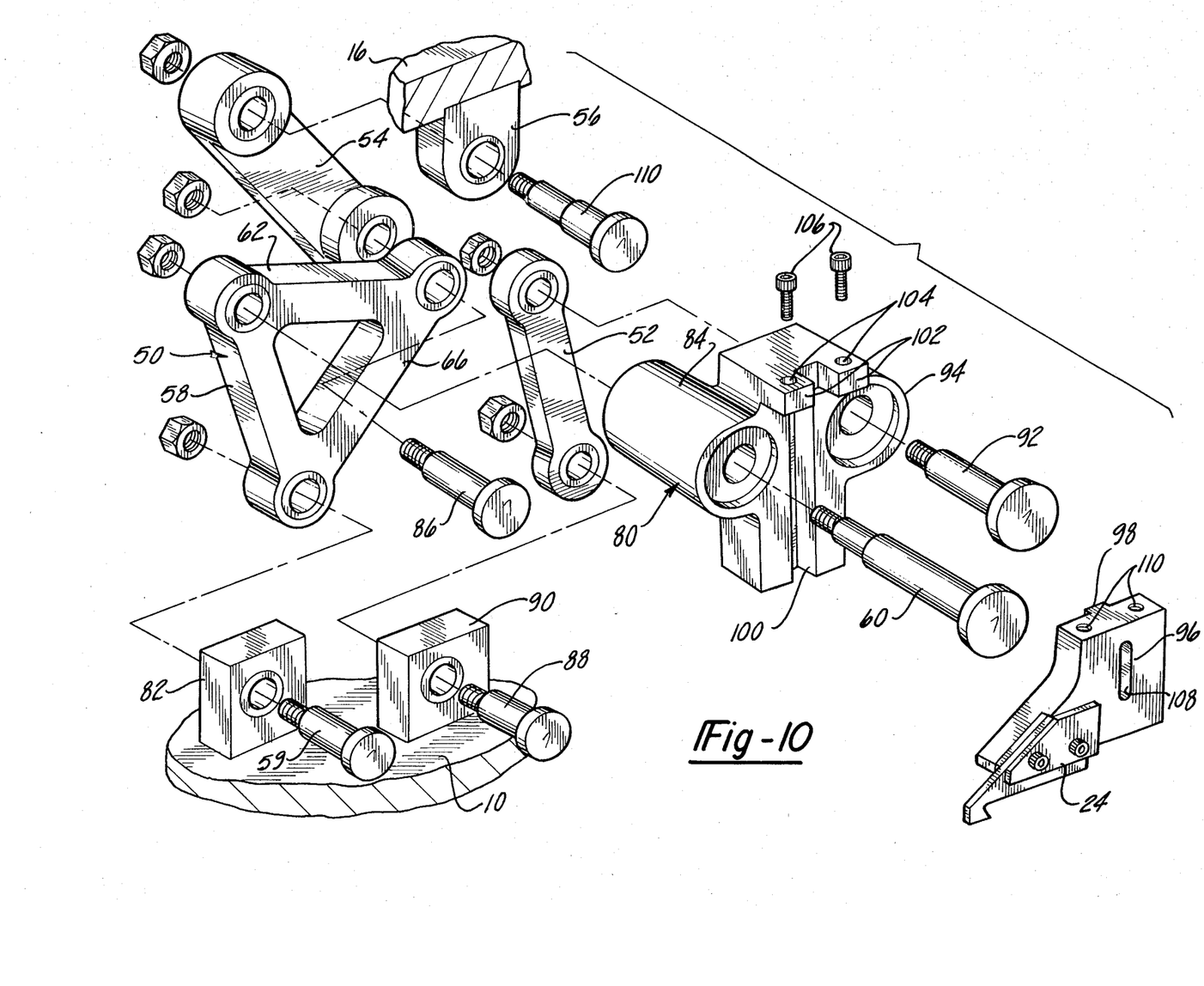
FIG. 10 is an exploded view of the second embodiment.

It will be appreciated that carriage 80 of the second embodiment performs essentially the same function as is performed by carriage 22 of the first embodiment. To adjustably support the blade 24, as a holder 96 is provided with a vertical key 98 which fits into a keyway slot 100 in carriage 80. A slot 108 receives screws (not shown) for connection to the carriage 80 as previously described with reference to the first embodiment. Feet 102 on the upper extremity of carriage 80 are provided with holes 104 to receive screws 106 which enter tapped holes 110 in the top of holder 96 for fine position adjustment or holder 96 relative to tubing 14. Holder 96 is relieved on one surface to provide a nesting pocket for blade 24 as shown in FIG. 10.

The apparatus of FIGS. 7-10 comprises means for operating the clamping jaws 13 in substantially the same manner as was described with reference to the first embodiment; i.e., a cam 74 depending from the upper platen assembly 16 is driven between appropriate followers to drive the clamping jaws together and apart by way of suitable slides.

In operation the upper platen assembly 16 is driven by the press towards the base 10 to rotate the link 50 about pin 59 and cause connection point 60 to travel in an arcuate path. This in turn causes the blade 24 to travel in an arcuate path across a top tubing section and then laterally and downwardly away from the descending vertical blade 20 so as to clear the notching blade 24 out of the path of the vertical blade as quickly as possible and in a minimum stroke length.

It can be seen from the foregoing that both embodiments of the invention provide the desired advantage through essentially parallelogram link connections between a horizontal blade holder and a base assembly; i.e., the horizontal or notching blade assembly is driven in an arcuate path but with constant attitude to clear the notching blade out of the path of the descending vertical blade in a minimum stroke distance.

We claim:

1. A tube shearing apparatus of the type wherein a first blade is drawn across the tube to notch a wall section and a second blade is thereinafter driven through the tube using the notched section as an entry point, wherein the improvement comprises:

a base;

an upper platen assembly reciprocally movable relative to the base and adapted to carry the second blade;

a support carriage for the first blade;

a pair of parallelogram links interconnecting the base and the blade support carriage to control the relative motion therebetween so as to define an arcuate path of travel for the first blade which extends across the tube section and thereafter arcuately away from the tube section and toward the base; and drive means interconnecting the upper platen assembly and the blade support carriage for driving the blade support carriage along said arcuate path of travel as the upper platen assembly moves toward the base.

2. Apparatus as defined in claim 1 wherein the drive means comprises a cam depending from the upper platen assembly, and follower means connected to the blade support carriage, said cam and follower means being operatively associated to drive the blade support carriage through said path of travel as the upper platen moves toward the base.

3. Apparatus as defined in claim 2 wherein said cam comprises a depending arm having an internal cam track of obliquely angled orientation relative to the path of travel of the upper platen assembly, said follower means comprising a roller disposed within said cam track.

4. Apparatus as defined in claim 2 further comprising tube clamping means.

5. Apparatus as defined in claim 4 wherein the tube clamping means is operated by the upper platen assembly.

6. Apparatus as defined in claim 2 wherein the tubing is round in cross section.

7. Apparatus as defined in claim 2 further including a holder for the first blade, and means for adjustably mounting the holder on the carriage.

8. Apparatus as defined in claim 1 wherein the drive means comprises a drive link interconnecting the upper platen assembly and one of the parallelogram links.

9. Apparatus as defined in claim 8 wherein one of the parallelogram links is triangular in configuration, the drive link being connected at one end to the upper platen assembly and at the other end to one leg of the triangular link.

10. Apparatus as defined in claim 8 further including means for clamping said tubing.

11. Apparatus as defined in claim 10 wherein said clamping means is operated by the upper platen assembly.

* * * * *